3,316,241
PROCESS FOR THE RECOVERY OF POLYSACCHARIDE GUM POLYMERS
Hans J. Leder and Guido M. Miescher, Terre Haute, Ind., assignors to Commercial Solvents Corporation, New York, N.Y., a corporation of Maryland
No Drawing. Filed Dec. 16, 1965, Ser. No. 514,379
6 Claims. (Cl. 260—209)

This invention relates to a process for the recovery of polysaccharide gum polymers. In a particular aspect this invention relates to the recovery of polysaccharide B-1459 from its fermentation medium by drying the fermentation medium, contacting the dried fermentate with a single-phase, liquid mixture of methanol, water and a material selected from the group consisting of acetone and 1,1,1-trichloroethane and separating the polysaccharide B-1459 from the liquid mixture.

Polysaccharide B-1459 is a polysaccharide gum polymer which is produced in an aqueous nutrient fermentation medium by the action of the microorganism *Xanthomonas campestris* B-1459. The polysaccharide and a method for its preparation are described in detail in Journal of Biochemical and Biological Technology and Engineering, vol. 3, No. 1 (S. P. Rogovin et al.). The procedure for obtaining the polysaccharide involves introducing a culture of the microorganism into an aqueous nutrient medium containing suitable sources of carbohydrate, nitrogen and mineral salts and holding the mass at fermentation conditions until polysaccharide B-1459 is produced in maximum yields.

The fermentate obtained by the above described procedure is a highly viscous mass which contains impurities in addition to polysaccharide B-1459. At the present time polysaccharide B-1459 is recovered from this highly viscous fermentation medium by a long and involved multi-step procedure. Generally stated the prior art procedure consists of the following sequence of steps:

(1) Adjusting the pH of the fermentate downward to approximately 5 to 6 with a mineral acid;
(2) Adding methanol to the fermentate in an amount to effect a methanol concentration in the fermentate of approximately 25% by volume;
(3) Centrifuging the fermentate to remove suspended impurities;
(4) Adding potassium chloride to the fermentate to precipitate the polysaccharide;
(5) Adding methanol for a second time to the fermentate to bring the methanol concentration to approximately 50%; and
(6) Centrifuging the fermentate to recover the polysaccharide material.

The outlined procedure possesses many inherent disadvantages. When commercial operations are considered, the need to use and recover large quantities of methanol and the need to repeatedly handle large quantities of fermentation liquids become important disadvantages.

It is an object of the present invention to provide a novel process for the recovery of polysaccharide B-1459 from its fermentation medium.

It is a further object of the present invention to provide a simplified method for the recovery of polysaccharide B-1459 from its fermentation medium which is readily and economically adapted to large-scale, commercial operations.

Other objects and advantages of the present invention will be apparent from the specification and appended claims.

Generally stated the objects of the present invention are attained by the following sequence of steps:

(1) Drying the fermentation medium (fermentate) to obtain a solid material containing polysaccharide B-1459;

(2) Contacting the solid material with a single-phase, liquid mixture consisting essentially of methanol, water and a material selected from the group consisting of acetone and 1,1,1-trichloroethane to form a dispersion of the polysaccharide B-1459 in the said liquid mixture; and (3) Separating the polysaccharide B-1459 from the liquid mixture.

The drying step of the present invention may be carried out in any suitable manner for removing water from fermentation media. For example, the drying may be carried out in conventional equipment using well known drum-drying and vacuum-drying techniques.

The contacting step of the present invention can be carried out in any suitable manner in conventional equipment. Either batch or continuous techniques can be suitably employed. As one example the liquid mixture can be charged to a tank equipped with an agitator. With the agitator running the solid material is then charged to the tank. Stirring is continued until a dispersion is formed.

As previously stated the single-phase, liquid mixture used in the contacting step of the present invention consists essentially of methanol, water and a material selected from the group consisting of acetone and 1,1,1-trichloroethane. The percentage of water in the liquid mixture should be at least about 3% but not more than about 20% by volume of the liquid mixture. It has been found that when the liquid mixture contains more than 20% water the polysaccharide becomes excessively gummy and thus is difficult to separate from the liquid mixture. It has also been found that liquid mixtures containing less than 3% water do not effectively remove water-soluble impurities from the polysaccharides. Preferably the liquid mixture should contain from about 5 to about 15% water. The ratio of methanol to either acetone or 1,1,1-trichloroethane in the liquid mixture is also of importance in the present invention. Suitable results are generally obtained using a volume ratio of methanol to acetone or 1,1,1-trichloroethane of about 4:1 to about 1:2. A ratio of methanol to acetone or 1,1,1-trichloroethane of about 1.5:1 to about 1:1.5 is preferred. Since methanol, water and either acetone or 1,1,1-trichloroethane are miscible one in the other, the above described percentages and ratios can be effected by blending the three components. Alternatively, the water portion can be supplied by the use of aqueous methanol or aqueous acetone.

The amount of liquid mixture used in the present invention may vary depending among other things on the number of times the contacting treatment is repeated, the type of equipment in which the invention is practiced, etc. In any event the amount of liquid mixture should be sufficient so that the solid material is totally dispersed in the liquid mixture. Typically the amount of liquid mixture utilized will be from about 4 to about 20 milliliters per gram of solid material. Although the use of excess amounts of the liquid mixture, i.e. amounts greater than 20 milliliters per gram of solid material, does not detract from the operability of the invention, it serves no useful purpose and therefore is preferably avoided.

The temperature at which the contacting step is carried out can vary over a wide range. However, the process of the invention is generally less effective in the removal of certain impurities from the polysaccharide at low temperatures, such as 0° C. or lower. In determining the upper temperature limit the exact boiling point of the liquid mixture should be considered. Generally a temperature range for the liquid mixture of from about 20 to about 50° C. is preferred.

The time of contact will also vary depending among other things on the amount of liquid mixture utilized, the contacting temperature, etc. In any event the contact time must be sufficient to permit dispersion of the solid material in the liquid mixture. Generally, contact time ranging from several minutes to several hours are employed.

After the solid material containing the polysaccharide B–1459 has been contacted with the liquid mixture for a desired period of time the polysaacharide B–1459 is separated from the liquid mixture. Such separation can be effected by conventional means such as decantation, filtration and centrifugation. The separated polysaccharide B–1459 will generally contain a small amount of residual water. This can be removed by any conventional methods such as vacuum-drying, acetone-washing, etc. The color of the recovered polysaccharide B–1459 typically can range from light tan to creamy white. It has been observed that the recovered material is lighter in color when 1,1,1-trichloroethane is used in the process of the invention than when acetone is used.

The invention will be understood more fully by reference to the following specific examples. It is understood that the examples are presented for purposes of illustration only and are not intended as a limitation of the invention.

EXAMPLE 1

This example is offered to show the production of polysaccharide B–1459 by fermentation in an aqueous medium with the organism *Xanthomonas campestris* NRRL B–1459 and the recovery thereof the material in accordance with the present invention.

*Fermentation*

65 gallons of a sterilized aqueous fermentation medium having the following composition:

| | Percent by weight |
|---|---|
| Dry milled corn starch | 3.9 |
| $K_2HPO_4$ | .14 |
| $MgSO_4 \cdot 7H_2O$ | .04 |
| Lard oil (as defoamer) | .001 | were charged to a 500-gallon fermentor. The pH of the medium was adjusted upward to 7.0 with aqueous sodium hydroxide. The medium was then aseptically inoculated with 4 liters of an inoculum prepared by growing a culture of *Xanthomonas campestris* NRRL B–1459 for 24 hours in an inoculum medium of the following composition:

| | Percent by weight |
|---|---|
| Dry milled corn starch | 4.2 |
| $K_2HPO_4$ | .25 |
| $MgSO_4 \cdot 7H_2O$ | .10 |

The inoculated fermentation medium was then incubated at 30° C. for a period of 72 hours. At the end of the incubation period the resulting fermentate was found to contain polysaccharide B–1459. The viscosity of the fermentate was measured on a Brookfield viscometer using a No. 4 spindle at 30 r.p.m. At 25° C. the value was 6560 centipoises.

*Recovery*

The above fermentation containing polysaccharide B–1459 was dried on a conventional drum dryer under pressure at 150° C. A solid, dry-to-the-touch material containing polysaccharide B–1459 was obtained.

200 mls. of a single-phase, liquid mixture prepared by blending 100 mls. of acetone and 100 mls. of 85% aqueous methanol were charged to a 500-ml. flask. A 50-gram portion of the solid dry-to-the-touch material containing polysaccharide B–1459 was added to the contents of the flask, and the flask was sealed by means of a stopper. The flask was then placed on a rotary shaker and agitated for 19 hours at 300 r.p.m. A dispersion of solid material in the liquid mixture was formed. At the end of the 19-hour period the dispersion was filtered through filter paper in a Buchner funnel by suction of a water aspirator. The solid material on the filter paper was collected, suspended in 200 mls. of a freshly prepared mixture containing 100 mls. acetone, 85 mls. methanol and 15 mls. water, agitated and filtered as described above to obtain a second filter cake. The treatment was once again repeated using the second filter cake. The final filter cake was then washed with 50 mls. of acetone. 41.4 grams of polysaccharide B–1459 was obtained.

The Brookfield viscosity of the recovered polysaccharide B–1459 was determined in aqueous solutions at 1% and 2% concentrations. The 1% and 2% viscosity measurements were made at 25° C. and 6 r.p.m.'s using a No. 3 spindle and a No. 4 spindle respectively. The values are given in Table 1 under the designation Sample A.

The Brookfield viscosity of a portion of the dried fermentation which was not subjected to treatment with a mixture of methanol, acetone and water was determined in aqueous solutions at 1% and 2% concentrations following the procedure of the paragraph immediately above. The values are given in Table 1 under the designation Sample B.

TABLE 1

| Brookfield Viscosity in Centipoises | 1% Solution | 2% Solution |
|---|---|---|
| Sample A | 6,260 | 29,400 |
| Sample B | 4,040 | 20,600 |

EXAMPLE 2

A 50-gram portion of the dried fermentate of Example 1 containing polysaccharide B–1459 which was prepared on the conventional drum dryer at 150° C. was treated following the procedure of Example 1 in all essential details with the exception that a single-phase, liquid mixture prepared by blending 100 mls. acetone and 100 mls. 70% aqueous methanol was substituted for the liquid mixture of Example 1. 39.8 grams of polysaccharide B–1459 were recovered.

EXAMPLE 3

A 50-gram portion of the dried fermentate of Example 1 containing polysaccharide B–1459 which was prepared on the conventional drum dryer at 150° C. was treated following the procedure of Example 1 in all essential details with the exception that a single-phase, liquid mixture prepared by blending 100 mls. 1,1,1-trichloroethane and 100 mls. 70% aqueous methanol was substituted for the liquid mixture of Example 1. Polysaccharide B–1459 was recovered.

Since many embodiments of this invention may be made and since many changes may be made in the embodiments described, the foregoing is to be interpreted as illustrative only and the invention is defined by the claims appended hereto.

We claim:

1. A process for the recovery of polysaccharide B–1459 from its normally viscous fermentation medium which comprises drying said fermentation medium to form a solid material with a single-phase, liquid mixture consisting essentially of methanol, water and a material selected from the group consisting of acetone and 1,1,1-trichloroethane to form a dispersion of the said polysaccharide B–1459 in the said liquid mixture, and separating the said polysaccharide B–1459 from the said liquid mixture.

2. The process of claim 1 wherein the material is acetone.

3. The process of claim 2 wherein the said liquid mixture contains from about 3 to about 20% by volume of water based on the volume of the liquid mixture and wherein the said liquid mixture has a volume ratio of methanol to acetone of about 4:1 to about 1:2.

4. The process of claim 1 wherein the material is 1,1,1-trichloroethane.

5. The process of claim 4 wherein the said liquid mixture contains from about 3 to about 20% by volume of water based on the volume of the liquid mixture and wherein the said liquid mixture has a volume ratio of methanol to 1,1,1-trichloroethane of about 4:1 to about 1:2.

6. The process of claim 1 wherein the temperature of the liquid mixture is in the range of from about 20 to about 50° C.

References Cited by the Examiner

UNITED STATES PATENTS 3,232,929  2/1966  McNeely et al. _____ 260—209
3,256,271  6/1966  Schweiger _____ 260—234

LEWIS GOTTS, *Primary Examiner.*

J. R. BROWN, *Assistant Examiner.*